Dec. 16, 1924.
A. F. GILLET
HOSE CLAMP
Filed Dec. 4, 1922
1,519,130
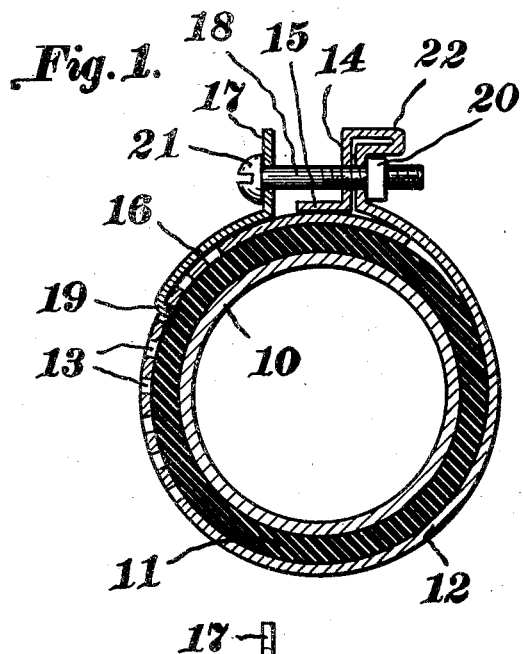
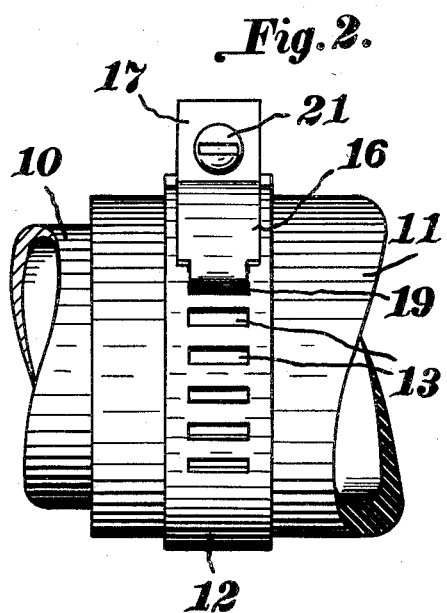
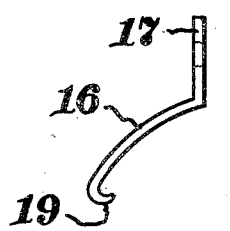
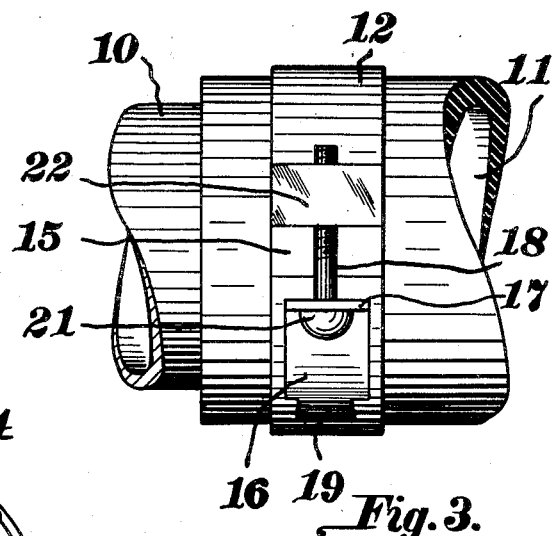
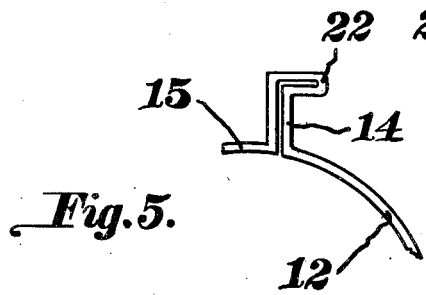
Inventor
A. F. Gillet.
By Arthur H. Sturges.
Attorney Patented Dec. 16, 1924.

1,519,130

UNITED STATES PATENT OFFICE.

ALEXIS F. GILLET, OF OMAHA, NEBRASKA, ASSIGNOR TO JUBILEE MANUFACTURING COMPANY, OF OMAHA, NEBRASKA.

HOSE CLAMP.

Application filed December 4, 1922. Serial No. 604,738.

*To all whom it may concern:*

Be it known that I, ALEXIS F. GILLET, a citizen of the United States, residing at Omaha, in the county of Douglas and State of Nebraska, have invented certain new and useful Improvements in Hose Clamps, of which the following is a specification.

The present invention relates to improvements in clamps for use in binding hose upon pipes, such for instance as the hose connected between automobile radiators and the water jackets of the engine.

Under service conditions of this kind the metallic band of which the clamp is in part composed is subjected to a high degree of heat which is constantly being given off by the continuously flowing highly heated water and inasmuch as economy in construction demands that the band be made of a rather cheap material, the conditions of service comb ned with the inferiority in material caused breakage and loosening of the band due to expansion and drawing out of the metal and altogether clamps as heretofore used in this connection have proved unsatisfactory, troublesome and expensive and have furthermore been the source of much injury to the hose itself.

It is an object of the invention to improve the construction of clamps particularly with the above conditions in view and at the same time to retain economy in production and a relatively great range of adjustability and improve strength and endurability.
Other objects of the invention are to provide a clamp which is not apt to injure the hose, is easy to install and remove and is readily adjustable and which will in general not be affected by the conditions heretofore described subject to the defects inherent in previous constructions.

With the foregoing and other objects in view, the invention will be more fully described hereinafter, and will be more particularly pointed out in the claim appended hereto.

In the drawings, wherein like symbols refer to like or corresponding parts throughout the several views:
Figure 1 is a cross sectional view through a pipe and hose and also showing in transverse section the improved clamp.

Figure 2 is a side view of the same with the pipe and hose broken away.

Figure 3 is a top plan view of the parts as illustrated in Figure 2.

Figure 4 is an edge view of a detail, and

Figure 5 is a fragmentary side view showing one end construction of the clamp band.

Referring more particularly to the drawings, wherein a single embodiment only of the invention is illustrated, 10 designates a pipe, for instance the terminal end of the pipe projecting from an automobile radiator and 11 represents the rubber or fabric hose which is connected between the radiator and the water jackets in the eng ne cylinder block, such hose being stretched over the outer end of the pipe section 10 as illustrated.

The clamp is intended to embrace that portion of the hose 11 which extends about the pipe end 10 and functions to clamp the hose tightly upon the pipe so as to avo d leakage and insure the permanency of this connection despite the effects of road travel.

The hose clamp includes a band 12 of a thin flat and relatively wide character made from some comparatively cheap material and being heavily galvan zed to resist rusting action of the water which is bound to find its way into contact with the clamp. Thin flexible sheet metal will be found an excellent material of which to make the band and such material is readily punched so that it becomes easy and economical to produce therein the elongated series of slots 13 near one end of the band. The ends of the band are overlapped and the outer end is bent and shaped to provide a lug of double thickness extending outwardly from the band at an angle to the radius of the pipe and hose. An overhanging head 22 projects angularly from the outer portion of the lug 14 and these parts are formed by carrying the metal outwardly from the band then turning it at right angles for a suitable distance to get the length of head 22 desired, after which the material is returned upon itself forming the inverted L substantially parallel with the portions of the head and lug previously formed so that a double reinforced construct on results. The terminal end 15 of the band is continued in the same direction with the body of the band and acts as a foot or stop as will be later described. The lug 14 is perforated as to both its walls, the perforations lying in registry with a similar perforation made in the upstanding lug 17 of a clamp plate 16 which is adapted to overlie the band and is provided with a hook 19 adapted to engage and enter the slots 13. The bill of the hook is preferably short and dull to avoid its biting into or tearing the fabric of the hose 11 and inasmuch as the clamp plate 16 is given a curvature to correspond with that of the band so that it will contact with it throughout, no canting or dislocation of the clamp plate is apt to occur such as would cause the removal of the hook 18 from the slot it engages.

Moreover the tension under which the clamp plate is at all times kept will result in a lack of opportunity for the escape of the hook. Through the alining perforations in the lugs 14 and 17 is passed a bolt 18 having a slotted head 21 to receive a screw driver or like implement for rotating the bolt in order to engage the threads thereof through a nut 20 which is fitted against the outer side of the lug 14 and with one of its faces engaging with the bottom wall of the head 22 in order to avoid the nut's rotation.

Now in the use of the device, the hose end 11 having been slipped over the pipe end 10, the band 12 is made to encircle both of these overlapped parts and the ends of the band itself are brought into the overlapping relation indicated in Figure 1. The clamp plate 16 is put in place with its hook 19 engaging a selected slot 13 and the nut 20 having been alined with the perforations in the lug 14 the bolt 18 is inserted through the lug 17 and subsequently through the lug 14 and until its end is engaged with the screw-threaded opening in the nut 20. It is thereupon turned while the nut is held stationary by the lug 22 until the pressure becomes suitably great to clamp the hose tightly upon the pipe. Should it be found that the band will not tighten sufficiently, the bolt 18 may be again loosened and the hook of the clamp plate set back a slot. Should the band furthermore become elongated by reason of use and the constant tension to which it is subjected, the hook may be caused to further retreat. The foot or stop 15 will engage the clamp plate or its lug 17 and avoid a too great compression of the galvanized sheet iron band 12 inasmuch as due to the inexpensive character of these bands they are not apt to withstand the pressure. However the pressure developed by the bolt within the limits prescribed by the foot or stop 15 will be found sufficient for a leak proof joint and a tight clamping of the hose in place such as will resist the shocks and jars incident to road travel.

While the band 12 is made of a cheap material, the clamp plate 16 is of a stronger and sturdier construction, being made from a better grade of material, as otherwise its hook would be apt to pull out straight under the influence of the enormous pressure developed by the bolt 18 and the tendency of the hose to expand. However this clamp plate is of an exceedingly small construction as compared with the band or the clamp as a whole and consequently this item will not greatly increase the market price of the article, at the same time providing the necessary strong and durable construction.

The cheap material of the band 12 will also not affect the stability of the lug 14, as this is of a double-walled thickness and moreover the lug is reinforced by the angular character of the head 22 which vertically gives all of the strength possessed by angle-iron construction. Furthermore additional strength is secured by the presence of the foot or stop 15 by which strains developed by the pull of the bolt 18 will be transmitted through the foot to the band, hose and rigid pipe 10 beneath.

It will therefore be appreciated that while retaining a low market price, the strength, range of adjustability and general constructive character of devices of this kind are improved greatly by the constructions, arrangements and combinations suggested by the present invention.

I do not wish to be restricted to the size, form, and proportions of the various parts, and obviously changes could be made in the construction herein described without departing from the spirit of the invention, it being only necessary that such changes fall within the scope of the appended claim.

I claim:—

A hose clamp comprising a thin flat metallic band having overlapped ends, a doubled-thickness lug extending outwardly from one end of the band and having an angular head at its outer side and a foot-piece at its inner side, a clamp having a hook to adjustably engage the end of the band opposite to that carrying said lug, said clamp having a second lug, a bolt extending through the lugs, and a nut on the bolt held against movement by said head.

In testimony whereof, I have affixed my signature in presence of two witnesses.

ALEXIS F. GILLET.

Witnesses:
ARTHUR H. STURGES,
HIRAM A. STURGES.